Dec. 6, 1932.  C. W. OBERT  1,889,874
NOZZLE MOUNTING
Filed March 27, 1931
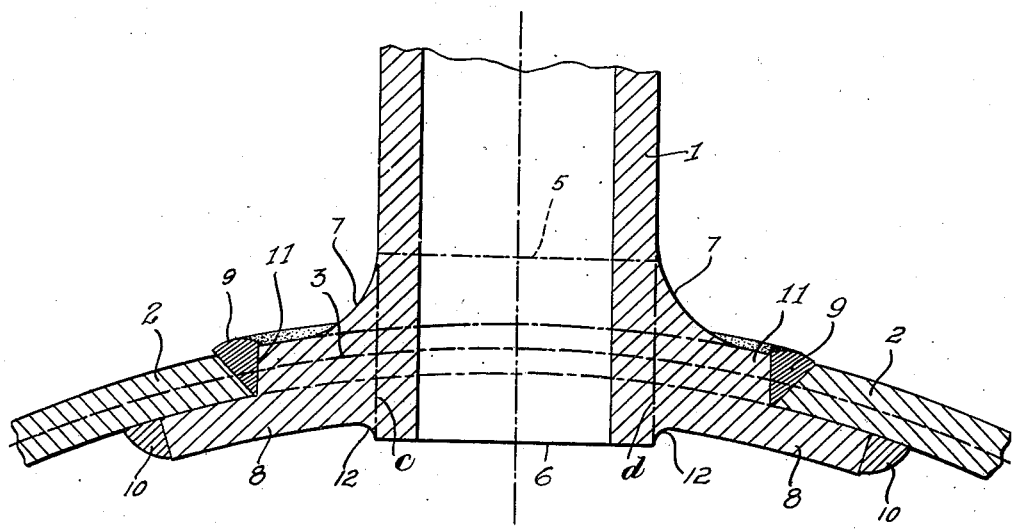
INVENTOR:
Carl W. Obert,
By Byrnes, Townsend & Potter,
ATTORNEYS.

Patented Dec. 6, 1932

1,889,874

UNITED STATES PATENT OFFICE

CASIN W. OBERT, OF MOUNT VERNON, NEW YORK, ASSIGNOR TO THE LINDE AIR PRODUCTS COMPANY, A CORPORATION OF OHIO

NOZZLE MOUNTING

Application filed March 27, 1931. Serial No. 525,850.

The invention relates to apertured outlet members for pressure vessels and especially to nozzle mountings.

It is known that the unequal circumferential distribution of fibre stresses which are present in the margin of an aperture in a curved or dished plate can be equalized by disposing a specially proportioned cylinder of metal within the opening and mounting it on the margin. One method of calculating a cylinder of metal which is capable of substantially equalizing the stresses in the margin of the opening in a dished or cylindrical plate is shown by the following formula but other formulae which give substantially the same result can be used.

$$A = r\sqrt{\left(\frac{x}{x-2} - L\right)}, \text{ in which}$$

$A$ = the thickness of the wall of the cylindrical collar.

$r$ = the radius of the opening of the collar.

$x = \dfrac{h}{t} =$ ratio of the altitude of the cylindrical collar to the thickness of the plate.

$L$ = distance between the outer surface of the cylinder and the margin of the opening of the plate.

$L + A + r$ = radius of the opening in the plate.

The reinforcing cylinder is mounted symmetrically with respect to the plate with its axis normal to the plate. The space between the cylinder and the plate is filled in with metal and fillets are added to produce substantially equal distribution of stresses at the surfaces of the plate.

According to the invention a peripheral flange is added to the above described structure and the flange is attached to the inner surface of the plate so as to form a tension member when the contents of the vessel are under pressure. The invention provides a more economical construction for nozzle and man-hole mountings than former methods of mounting in which it was necessary to forge the stress-equalizing metal and the plate together as a unit in order to give the required strength. The flanged mounting is at least as strong as the forged equalized structure and the distribution and equalization of the stresses is maintained. I prefer to weld the flange itself in contact with the inner surface of the plate but other means of attaching this portion of the mounting, such as riveting may be used.

In the drawing constituting a part hereof, The single figure is a view in cross section of a flanged nozzle mounting embodying the invention.

The base of the nozzle 1 shown in the figure is representative of a structure proportioned according to the above formula. The mean radius of the opening in the plate 2 is taken along the line 3 and the altitude of the cylindrical portion of metal between the dotted line 5 and the line 6 is taken as the altitude. The imaginary outer surface of the calculated cylinder is indicated by the dotted lines $c$ and $d$ and the inner surface of the cylinder is determined by the bore at the base of the nozzle. The cylinder is made integrally with the metal which is disposed between the imaginary outer surface of the calculated cylinder and the margin of the plate 2 and the fillet 7 is formed in the latter metal. The outer end of the nozzle 1 is superimposed on the end of the cylindrical structure and it may be given any desired form.

According to the prior art a fillet similar to fillet 7 is formed on the inner end of the cylinder. According to the invention the flange 8 includes or is superimposed on the inner filleted portion and the flange 8 is extended to overlap the plate 2. The thickness of the outer peripheral portions of the flange 8 and the width of the flange 8 may be varied according to the thickness of the plate 2, the strength of the flange metal and the reinforcement the flange is expected to provide. The outer periphery of the flange is desirably about the thickness of the plate but it may be made thicker, or thinner as shown in the drawing. A fillet 12 is desirably formed where the flange is joined to the cylinder. The flange is desirably made to overlap the plate a distance equal to about the thickness of the plate 2 but the overlapping may be greater or less.

The nozzle 1, the calculated cylinder, the filled-in metal which includes the fillet 7 and the flange 8 may be made as a unit and proportioned so that the calculated cylinder of metal will be properly disposed with respect to the plate when the flange 8 is in place. The margin of the plate 2 is beveled and the added metal is desirably beveled at 11 to give a V which is filled in with the weld metal 9.

The nozzle member is attached by welding the margin of the plate 2 to the shoulder 11 of the nozzle and by welding the margin of the flange 8 to the interior surface of the plate 2. The attachment may be made by any convenient method of welding but I prefer to form the weld by fusing weld metal 9 in the V between the margin of the plate and the shoulder 11 and weld metal 10 between the margin of the flange and the inner surface of the plate.

Although I have shown a specific embodiment of my invention and one method of constructing a nozzle mounting in accordance therewith, it is to be understood that other forms of outlet members may be made and mounted in accordance with my invention and other methods of proportioning the metal in the nozzle to produce substantially equalized stresses may be used without departing from my invention.

I claim:—

1. The combination with a container having a curved apertured plate, of an outlet member having a basal portion proportioned to include an annular body of metal capable of substantially equalizing the stresses in the margin of the apertured plate, a flange on the annular portion constituting a tension member when the contents of the container are under pressure, said flange lying on the inside of the container and overlapping the margin of the plate and making contact with one surface thereof, a shoulder on the basal portion forming with the flange a recess for the plate, means attaching the shoulder to the margin of the plate, and means attaching the margin of the flange to said surface of the plate.

2. The combination with a container having a curved apertured plate, of a nozzle member having a basal portion proportioned to include an annular body of metal capable of substantially equalizing the stresses in the margin of the apertured plate, a flange on the annular portion adapted to overlap the margin of the plate and to make contact with one surface of the plate, a shoulder on the basal portion forming with the flange a recess for the plate, a welded joint between the shoulder and the margin of the plate and a welded joint between the margin of the flange and said surface of the plate.

3. In combination with an apertured container wall, an outlet member mounted in the aperture of the wall and having a basal portion including an annular metallic body of a thickness to substantially equalize the stresses produced in the margin about the aperture when mounted therein and a flange on said member lying within the container and overlapping the wall thereof about the aperture; said flange being joined to said wall so as to form a part thereof and to form a tension member opposing the tendency of the pressure of the container contents to rend the wall about the aperture.

4. In combination with an apertured container wall, an outlet member mounted in the aperture of the wall and having a basal portion including an annular metallic body of a thickness to substantially equalize the stresses produced in the margin about the aperture when mounted therein, a flange on said member lying within the container and overlapping the wall thereof about the aperture; and a shouldered portion in said flange forming therewith a recess for reception of the edge of the wall about the aperture; the edge of said flange and said shoulder being joined to said wall so as to form a part thereof and to form a tension member opposing the tendency of the pressure of the container contents to rend the wall about the aperture.

5. The combination with a container having an apertured curved wall of an apertured outlet member having a basal portion provided with a flange at one end adapted to lie in conformity to the inner surface of the container wall about said aperture and a shouldered portion extending the thickness of the wall and of a size to substantially fill the aperture in the wall; said wall being marginally welded to said flange and to said shoulder.

In testimony whereof, I affix my signtaure.
CASIN W. OBERT.